United States Patent [19]

Girardi

[11] 4,119,800

[45] Oct. 10, 1978

[54] RADIO-TELEPHONE INTERCONNECTION SYSTEM

[75] Inventor: Frank D. Girardi, New Kensington, Pa.

[73] Assignee: Port-A-Phone, Inc., Arnold, Pa.

[21] Appl. No.: 773,038

[22] Filed: Feb. 28, 1977

[51] Int. Cl.² .................. H04B 1/46; H04B 7/00; H04M 11/00

[52] U.S. Cl. .................... 179/2 EA; 325/22

[58] Field of Search ............ 179/41 A; 325/22

[56] References Cited

U.S. PATENT DOCUMENTS

| | | | |
|---|---|---|---|
| 2,935,605 | 5/1960 | Mathieu | 179/41 A |
| 3,366,880 | 1/1968 | Driver | 179/41 A |
| 3,443,035 | 5/1969 | McCay | 179/41 A |
| 3,557,312 | 1/1971 | Vogelman et al. | 179/41 A |

OTHER PUBLICATIONS

"The Radio Amateur's Handbook", American Radio Relay League, 1976 Ed. (Newington, Conn.), pp. 479-480.

*Primary Examiner*—Kathleen H. Claffy
*Assistant Examiner*—Kenneth A. Chayt
*Attorney, Agent, or Firm*—Jones, Tullar & Cooper

[57] ABSTRACT

Circuitry for interconnecting a radio transceiver to a telephone line is disclosed. The circuitry provides controlled access to the telephone system lines from remote radio transceivers by way of a base transmitter-receiver unit which is connected through an impedance matching network to the telephone line. A carrier operated relay responsive to the base receiver unit controls access to the telephone line by means of a time delay relay whereby signals received by the base station are connected to the telephone line. Audio signals originating in the telephone line are detected by a voice operated relay which activates the base unit transmitter to transmit such audio signals for two way communication with the remote radio unit on a single frequency channel.

5 Claims, 4 Drawing Figures

RADIO-TELEPHONE INTERCONNECTION SYSTEM

BACKGROUND OF THE INVENTION

The present invention relates, in general, to a system for interconnecting a radio system with a telephone line, and more particularly is directed to circuitry for providing a direct connection between the transmitter and receiver portions of a base station radio transceiver and the telephone line to permit radio contact between a remote transceiver and the telephone line.

Systems for providing access to telephone lines from remotely located radio transceivers have long been known, and such systems have found wide acceptance, not only among radio amateurs, but with business concerns, government, public health agencies, and the like, and have served a great variety of needs. However, such prior systems have generally been extremely complex in order to meet the specialized requirements of different groups of users, and thus have become much too expensive for the individual user. Furthermore, such prior systems have generally been designed for use with, or as a part of, particular radio units so that the purchase of such a system requires the concurrent purchase of the radio system for which it is designed. For potential users who already have a radio system in operation, such interconnections are impractical, as well as unduly expensive, and thus do not meet the needs of a large number of individuals.

Aside from the expense, it has been found that the complex systems of the prior art require a considerable amount of maintenance, are difficult to service, and thus require considerable more attention than the average user can give them, thus reducing the reliability of such systems and reducing their desirability.

SUMMARY OF THE INVENTION

The present invention avoids many of the difficulties of prior art systems by providing an inexpensive, simple, reliable interface system for providing communication between a remote transceiver and a telephone line. The present system is adaptable for use with any transceiver or any telephone system and thus is compatible with existing radio equipment so that users do not have to replace their existing radio equipment in order to use it. The system is easy to use, and consequently accomodates the occasional user of such equipment, as well as being sufficiently reliable to be compatible with more intensive users. Thus, the system of the present invention can be used to interconnect relatively simple and inexpensive citizens band transceivers to a telephone system, thereby effectively extending the range of such units, or can be used with more complex radio systems to provide greater flexibility and a wider scope of communication capability.

It is, therefore, an object of the present invention to provide circuitry for interconnecting a base transceiver with a telephone line to accomodate two-way, nonsimultaneous communication between a remote transceiver and the telephone line.

It is a further object of the present invention to provide simple, inexpensive yet reliable interconnection circuitry for a radio system whereby a remote unit can be connected through a base unit and a telephone matching circuit to a conventional telephone line.

Briefly, the present invention utilizes a first, or remote, manually operated transceiver of the push-to-talk type, such as a conventional citizen's band transceiver, and a second, or base, transceiver which is connected through a matching circuit to a subscriber line of a telephone system. The base transceiver and matching circuit make up a base station which provides interconnecting paths between the remote unit and the telephone line. The matching circuit connects the receiver portion of the base transceiver to the telephone line as one of the interconnecting paths, and provides an alternate second path between the telephone line and the transmitter portion of the transceiver whereby two-way communication may be effected. In addition, the matching circuit includes suitable relay networks reponsive to radio signals received at the base transceiver or to signals received from the telephone line to regulate the system for simplex operation on a single frequency channel and to provide trouble-free communication. To limit access to the telephone line, and prevent use by unauthorized operators having transceivers capable of operation at the radio frequency to which the base transceiver is tuned, a suitable decoder is provided which prevents activation of the matching circuit until a selected sequence of "unlocking" signals has been received.

The simplicity of the present system, its ease of use, and its low cost will provide for a broad spectrum of radio users a simple and convenient access to telephone lines which will expand the usefulness of their radio units and which will provide a convenient mode of communication not only for businesses and government users, but for individuals with limited financial resources.

BRIEF DESCRIPTION OF THE DRAWINGS

The foregoing and additional objects, features, and advantages of the present invention will become apparent to those of skill in the art from a consideration of the following detailed description thereof, taken in conjunction with the accompanying drawings, in which.

DESCRIPTION OF PREFERRED EMBODIMENTS

Figure 1:
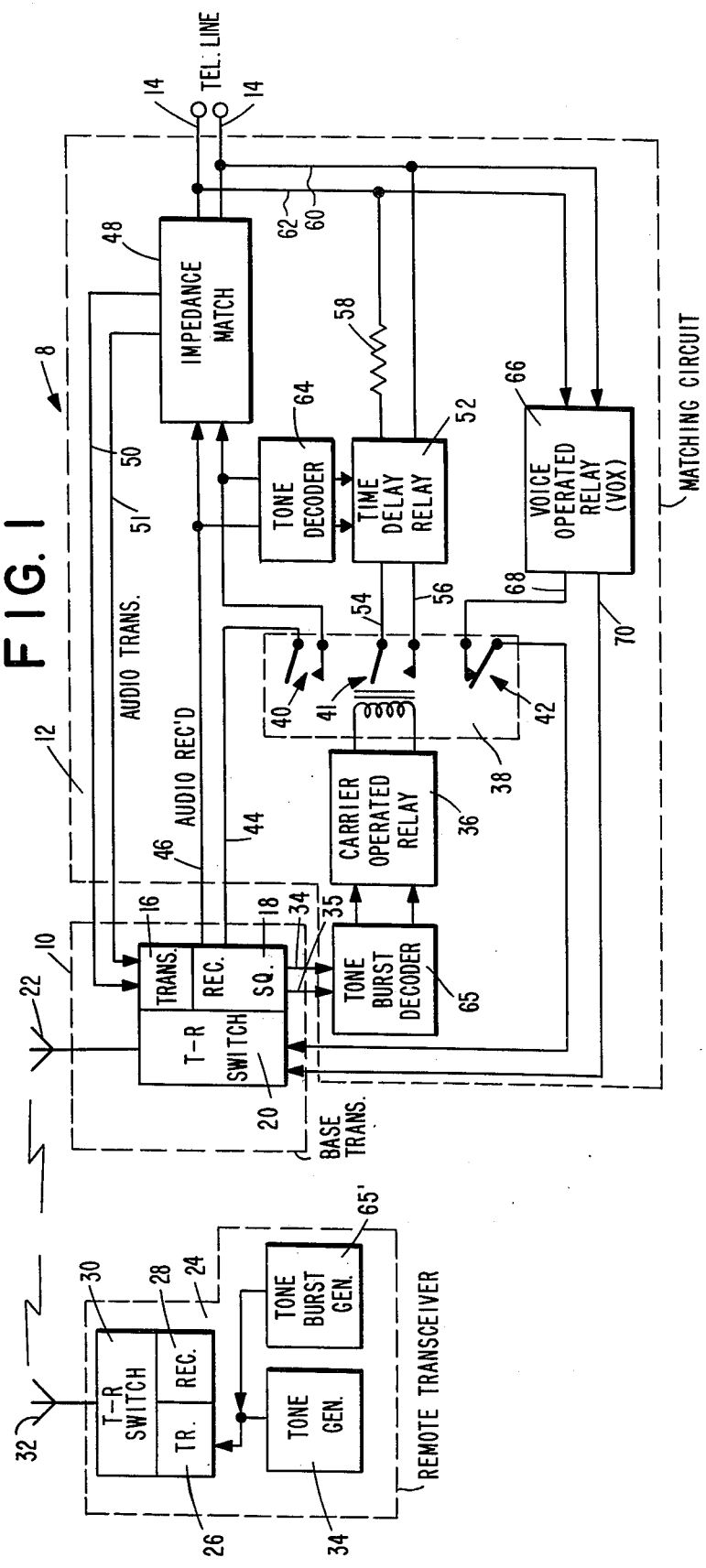
FIG. 1 is a simplified block diagram of a radio communication system utilizing the telephone matching circuitry of the present invention.

Turning now to more detailed consideration of the present invention, reference is made to the block diagram of FIG. 1, wherein a base station 8 includes a transceiver 10 connected by way of a matching circuit 12 to conventional subscriber telephone lines 14 of a telephone system, lines 14 leading to a central telephone office for interconnection with other telephone subscriber lines in conventional manner (not shown). Transceiver 10 is of conventional construction, and may be any commercially available unit having a transmitter section generally indicated at 16, a receiver section 18 and means such as a transmit-receive switch 20 connecting the transmitter or receiver portions to a suitable antenna 22 for alternately transmitting and receiving. The transceiver 10 may be any desired radio transmitter-receiver unit operating at any selected radio frequency, and typically may be a conventional citizen's band transceiver.

The base transceiver unit 10 is adapted for radio communication with any suitable remote radio unit compatible therewith, and thus may be adapted for two-way communication with a remotely located transceiver 24 which may also, for example, be a citizen's band transceiver. The remote unit 24 also includes a transmitter portion 26, a receiver portion 28, and means such as a transmit-receive switch for connecting the transmitter or receiver portions to a suitable antenna 32. The remote unit preferably is a "push-to-talk" unit which is normally in the receive mode, but which may be switched to the transmit mode by the operator for non-simultaneous, two-way communication. The remote unit preferably incorporates a tone generator 34 which typically will be a conventional Touch Tone pad adapted to generate selected tone signals for use in activating, or unlocking, the base station matching circuit 12, and for use in "dialing" a number over the telephone line, once a communication between the remote transceiver 24 and the telephone line 14 is established. Where the telephone system is not responsive to dialing tones, a rotary dial unit (not shown) of conventional construction is provided in addition to the Touch Tone pad 34, as will be explained.

To establish communication between the remote transceiver 24 and the telephone line 14, the operator at the remote station switches the remote unit 24 to its transmit mode, generating a carrier signal at the radio frequency, or channel, to which the base station transceiver 10 is tuned. The carrier signal is received at the base station, where it breaks the receiver squelch. The base unit receiver portion includes the usual squelch circuit which, in conventional manner, provides a squelch signal that cuts off the receiver output when no signal is coming through the receiver. Such squelch circuits are conventional in both base and mobile transceiver units and are particularly useful where the nosignal receiver hiss noise may be almost as loud as some of the weaker desired signals and where continuous monitoring of a fixed frequency is desired, as in the present case. A description of conventional squelch circuitry may be found, for example, in the Radio Amateur's Handbook, published by the American Radio Relay League, Newington, Connecticut, in particular at page 267 of the 51st edition published in 1974.

When the transceiver 10 is in its normal receive mode, the receiver squelch signal is applied by way of lines 34 and 35 to a carrier operated relay circuit 36 in the matching circuit 12. This relay circuit is activated by the presence of the squelch signal on lines 34, 35 to energize its associated relay 38 to shift switch contacts 40, 41 and 42. The energized relay 38 holds the switch contacts in the position indicated in FIG. 1, so that switches 40 and 41 are open and switch 42 is closed, thereby holding the matching circuit 12 in a neutral mode, or condition; i.e., in a condition where it is capable of receiving signals from either the remote station or the telephone lines. Receipt of a carrier wave signal from the remote transceiver of sufficient strength to operate the base unit will then break the squelch signal on line 34, deenergizing relay 38 and allowing the contacts 40, 41 and 42 to shift, thereby closing switches 40 and 41 and opening switch 42 to place the matching circuit 12 in its receive mode.

The audio output circuit of the receiver section 18, which may be derived, for example, from the speaker output terminals of transceiver 10, is connected by way of lines 44 and 46 to the matching circuit, line 44 being connected through switch contact 40 to an impedance match network 48, and line 46 being connected directly to the impedance match network. Network 48 matches the transceiver 10 to the telephone line 14 and provides electrical isolation between the telephone system and the base station transceiver. The match network 48 also permits proper adjustment of circuit impedance, energy level and other operating conditions to permit trouble free operation of the system.

The impedance match network 48 also includes a pair of output lines 50, 51 which connect network 48 and the matching circuit 12 the audio input of the transmitter portion 16 of transceiver 10. These lines carry audio signals from the telephone line to the transceiver unit for transmission to the remote station. Lines 50 and 51 may be connected to the conventional microphone input terminals of the transceiver.

A time delay relay network 52 is provided in the matching circuit 12 for activating the telephone line to enable the remote station to initiate contact with that line. The time delay relay is connected to the relay switch 41 by way of lines 54, 56. Since switch 41 is held open by the presence of a squelch signal, the time delay relay network is energized by the carrier operated relay circuit 36 only upon receipt of a radio signal at the base station which breaks the squelch. The time delay relay network then operates to connect a suitable resistor 58, of about 1200 ohms for example, across the telephone lines by way of lines 60 and 62 to simulate the picking up of a telephone hand set, and thereby produces a dial tone on the telephone line.

In order to prevent unauthorized use of the system, means are provided to lock the time delay relay network 52 so that random incoming signals cannot produce a dial tone. This prevents transceiver operators who happen to be transmitting on the frequency to which the base station 8 is tuned from dialing telephone numbers through the matching circuit of the present invention unless the time delay relay is first activated. This locking means may be a decoder 64 connected across the audio output lines 44 and 46 of the base transceiver. The decoder is reponsive to a predetermined sequence of signals from the remote transceiver to, in effect, unlock the time delay relay network 52 and thus to enable the base station. Decoder 64 may be a tone-responsive unit sensitive to a specified sequence of Touch Tones generated at the remote transceiver and transmitted to the base station. Upon receipt of the specified sequence of tones, the time delay relay network 52 is enabled, and since the carrier signals being received at the base station will have already operated relay 38 to close switches 40 and 41, the resistor 58 can be placed across the telephone lines to produce a dial tone which permits dialing of a desired number from the remote station. Suitable tone decoders useable for this purpose are well known, and may, for example, be constructed from a commercially available integrated circuit chip NE567, as described in the Radio Amateur's Handbook (ibid) at page 439.

A further protection for the system may be obtained through the optional use of a tone burst decoder 65 located in lines 34 and 35. Such a decoder would prevent spurious signals from turning the carrier operated relay circuit 36 on, and would require a corresponding tone burst generator 65' in the remote unit which would have to be activated in order to turn the base station on to receive signals from the remote station. In this way, response of the base station would be limited to remote stations operating on the proper frequency channel and capable of transmitting the required tone burst at the start of transmission.

The transmission of signals from the telephone line through the base station 8 to the remote transceiver 24 is accomplished by means of a voice operated relay (VOX) 66 which is included in the matching circuit 12 and is connected across the telephone lines 14 by way of lines 60 and 62. When the matching circuit is in its neutral mode, or condition, the VOX circuit is responsive to the presence of an audio signal on the telephone lines to complete a circuit through lines 68 and 70 and through contact 42 to activate the transmit portion of transceiver 10, thereby shifting both the matching circuit 12 and the transceiver to the transmit mode. As soon as this occurs, audio signals on the telephone line can pass through impedance match network 48 and audio transmit lines 50 and 51 to the audio input to the transmitter portion 16 of transceiver 10, whereby the audio signals are transmitted to the remote transceiver. As long as the base transceiver is held in its transmit mode by activation of the VOX circuit, it will broadcast any audio signals appearing on line 14 and will prevent reception of radio signals at the base station. The VOX circuit 66 accordingly must turn off at pauses in the signals from the telephone line to enable the base station to shift to its receive mode for two-way conversations. This is accomplished by providing a short time constant timing network for the VOX circuit, as will be explained below, so that it will turn off during pauses exceeding a selected length in the audio signal. During these pauses the base station returns to its neutral mode, and may be shifted to either the transmit or receive mode, depending on whether a signal from the remote station or the telephone line is received first.

In operating the radio-telephone communication system of the present invention, the base station transceiver operates unattended and in a normal receive mode, with the base matching circuit in its neutral condition. A remote operator-controlled transceiver, which may be a mobile unit mounted in an automobile or other vehicle, also normally operates in a receive mode. If the remote operator wishes to place a telephone call through the telephone line to which the base station is connected, the operator switches the remote transceiver to its transmit mode and, if one or more interlocks are being used to prevent unauthorized use of the base station, transmits a tone burst and/or a coded series of tones in accordance with the requirements of the tone burst decoder and/or the coded tone decoder in the matching circuit of the base station. The transmission of the carrier signal modulated by the selected audio frequency tone sequence operates to break the squelch signal on lines 34, 35 of the matching circuit to deenergize the carrier operated relay circuit 36, thereby permitting switches 40, 41 and 42 to shift to place the base station in the receive mode.

The closure of switch 40 permits the received audio frequency tone signals to be applied to the tone decoder 64, thereby to enable the time delay relay network 52, upon receipt of the proper sequence of tones, so that the concurrent closure of switch 41 places the resistor 58 across the telephone lines 14 to simulate the lifting of a telephone hand set, producing a dial tone at the telephone line. The opening of switch 42 disables the VOX circuit 66 to hold the base station in the receive mode.

Although the audio frequency dial tone on the telephone line 14 is applied to the input of the VOX circuit, switch 42 prevents that tone from shifting the base station to the transmit mode as long as the operator at the remote transceiver holds the remote unit in its transmit mode.

After the dial tone appears on the telephone line, the Touch Tone pad at the remote transceiver may be utilized in a conventional manner to transmit a series of Touch Tone audio frequency signals which are fed by way of receiver portion 18, audio lines 44 and 46, and the impedance match network 48 to the telephone lines 14 to dial a desired telephone number in the conventional manner. It should be noted that the remote operator should not listen for the dial tone before dialing, for to do so would require that he shift to the receiver mode, thereby releasing the carrier operated relay circuit 36. The dial tone would then shift the base station to the transmit mode and since this is a continuous tone it would capture the base station and hold it in the transmit mode until network 52 timed out to break the connection. Instead, the remote operator should merely dial the desired number immediately after transmitting the coded signals required to activate the base station.

If, after dialing the desired number, the operator at the remote transceiver 24 shifts that unit to the receive mode, as by releasing the push-to-talk switch, the base station receiver 18 will no longer have a carrier frequency being applied to it, and the squelch voltage will reappear, energizing the carrier operated relay circuit and its relay 38 to open switches 40 and 41 and to close switch 42, thereby releasing the matching circuit 12 from its receive mode so that the base transceiver can be switched to its transmit mode. Any audio frequency signal, such as the ringing signal, now appearing on the telephone line will cause the VOX circuit to switch the base station to transmit. Such audio frequency signals on line 14 are also applied by way of the impedance match network 48 and audio lines 50 and 51 to the transmitter portion 16 of the base station and are transmitted, so that the remote operator will hear the ringing signals and the called party's answer. The audio signals produced in line 14 when the called party answers serve to activate the VOX circuit 66 in the same way the ringing signals activate it, thereby shifting the base station to the transmit mode, if it has not already been signaled by the ringing signal.

As will be explained in greater detail hereinbelow, the VOX circuit includes a timing network which responds to any audio signals on line 14 to keep the VOX relay activated for a short period of time (for example, approximately 1½ seconds) after the end of such signals. This timing network, which may be adjusted to suit the needs of a particular station, operates when audio signals are being received from the telephone system to hold the base station in the transmit mode for a period sufficiently long to prevent the base unit from switching from the transmit to the receive mode during very short pauses in the audio signal, such as the pauses between syllables of a word. However, this time period is short enough to allow the remote operator to break into the conversation during longer pauses and to thereby shift the base unit to its receive mode periodically, as required by time delay relay network 52 to maintain the connection.

The VOX timing network also operates when the base station is receiving audio signals from the remote operator, for at this time audio signals applied to the telephone lines 14 from the impedance match network 48 will also be applied to the input of VOX circuit 66 to activate its timing network. This will not shift the base station to transmit, however, since the carrier operated relay circuit 36 will be holding switch 42 open at this time. At the end of a remote audio transmission the VOX will remain activated for 1½ seconds, allowing the base station to shift to its transmit mode as soon as the carrier operated relay 36 is released, so that any audio received from telephone line 14 within that 1½ seconds will be transmitted without syllable loss.

Once the time delay relay network 52 has been activated by a remote station, it remains active only for a predetermined period of time after the base station switches from its receive mode to its transmit mode. This relay holds the telephone line and thus permits transmission of audio signals from line 14 by the base unit. However, after a preset time on the order of 15 to 25 seconds the time delay relay network 52 will time out and remove resistor 58 from across the telephone line, "hanging up" the telephone system. The timing circuits in the time delay network 52 are renewed each time the base station receives a signal from the remote transceiver, however, so that a continuing two-way conversation will not be interrupted by premature hanging up of the telephone as long as the remote operator transmits every 15-25 seconds, depending on the setting of network 52.

Figure 2:
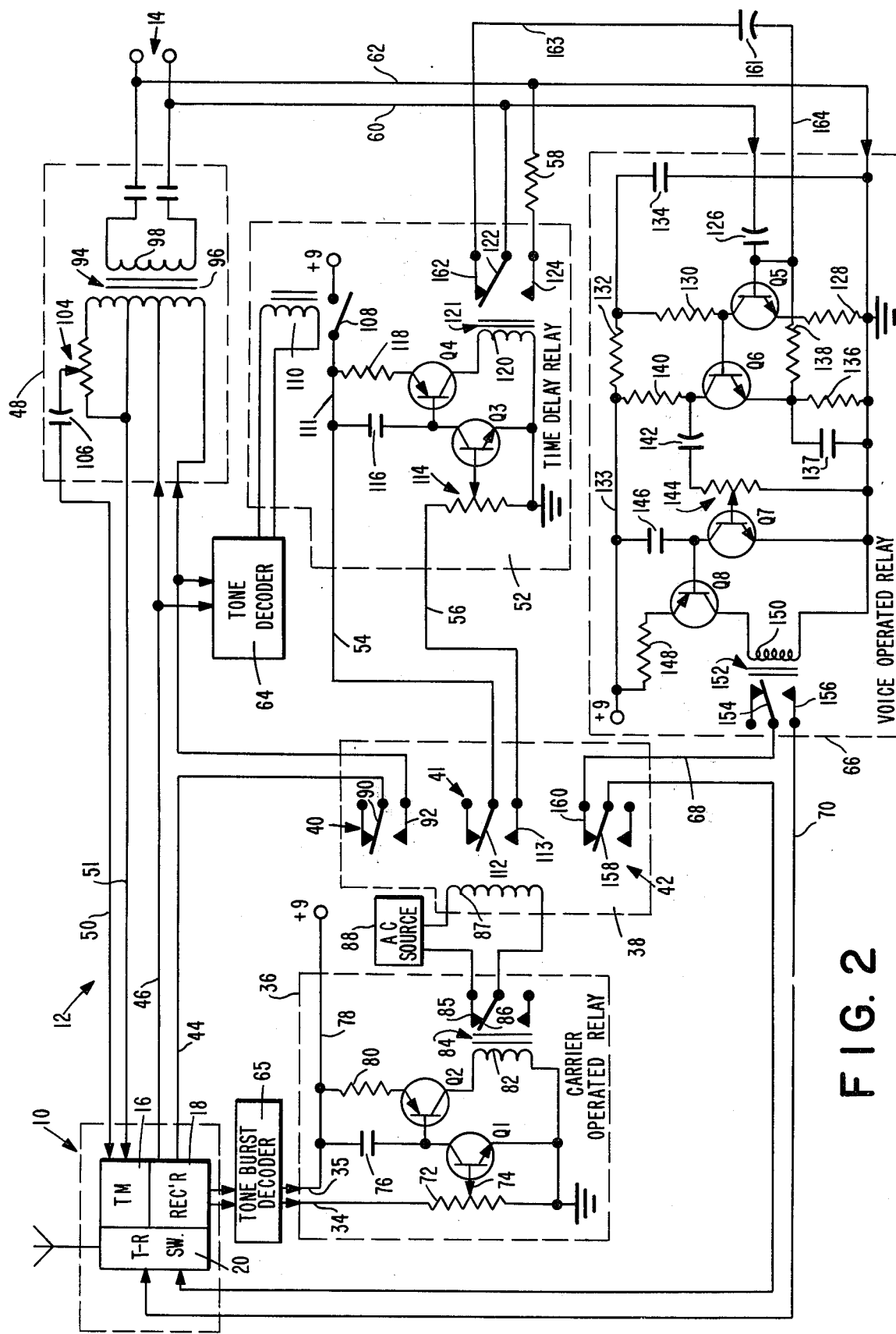
FIG. 2 is a schematic diagram of the telephone matching system of FIG. 1.

The schematic diagram of the base station portion of the present system is illustrated in FIG. 2 wherein the elements common to FIG. 1 are similarly numbered. Again, the base transceiver unit 10 is not shown in detail in this figure since that unit can be any one of many commercially available transceivers. Similarly, the tone decoders 64 and 65 are not shown in detail, since such devices are commercially available.

Referring first to the carrier operated relay circuit 36, it will be seen that the squelch signal from the receiver section of transceiver 10 is applied by way of lines 34 and 35 either through the tone burst decoder, if one is used, or directly to a first transistor amplifier Q1. Line 34 is connected through a potentiometer 72 to ground, with the sliding arm 74 of the potentiometer being connected to the base of transistor Q1. The potentiometer permits adjustment of circuit 36 so that it becomes activated at a selected squelch signal level. Q1 is connected in grounded emitter configuration, with its emitter connected to ground and its collector connected to the base of a second transistor Q2 operating as a switch and through a capacitor 76 to a bias supply line 78. The emitter of Q2 is connected through a resistor 80 to the bias line 78, while its collector is connected through the coil 82 of a control relay 84 which, when energized, closes its contacts 85 and 86 to connect the operating coil 87 of the main carrier relay 38 across a suitable source of supply voltage such as an alternating current source 88. Thus, a squelch signal on lines 34 and 35 operates to energize control relay 84, which in turn energizes the carrier relay 38. In the illustrated embodiment, relay circuit 36 and relay 38 are shown in their energized condition; that is, the condition when a squelch signal is present on lines 34 and 35. It will be understood that if desired the 110 volt AC-operated relay 38 may be replaced by a suitable 12 volt DC relay operating directly from the output of the carrier operated relay circuit 36, thereby eliminating the need for the control relay 84.

Switch 40 includes a movable contact 90 and a stationary contact 92 which are held in the open condition illustrated in FIG. 2 during energization of relay 38 to hold line 44 open. Upon release of the carrier operated relay 38, the movable arm 90 shifts into contact with arm 92, thereby closing line 44 and permitting audio signals to reach the impedance match network 48. As indicated, this latter network includes an isolation transformer having a tapped primary coil 96 and a secondary coil 98. Input line 44 is connected to one end of coil 96, while input line 46 is connected to a first tap on the primary coil. The secondary winding 98 is connected to the telephone lines 14 whereby audio frequency signals from the receiver are connected to the telephone line. A second portion of the primary coil 96, between a second tap and the opposite end of the coil, is connected across a potentiometer 104, the sliding arm of which is connected through a capacitor 106 to the audio transmit line 50. The second audio transmit line 51 is connected to the junction between the potentiometer and the second tap on the transformer, whereby audio signals from the telephone line may be applied, for example, to the microphone input terminals of the transmitter portion 16 of base transceiver 10. Potentiometer 104 provides a volume control for the telephone output so that the transmitter is not overdriven.

As previously explained, before signals can be fed through the matching circuit 12 from the base transceiver to the telephone line, the time delay relay network 52 must be activated. This is accomplished by means of two switches, the relay switch 41 and a tone decoder relay switch 108. Switch 108 is located in the bias supply for network 52, and is operated by a relay coil 110 connected to the output of tone decoder 64 for energization when the tone decoder is activated by a predetermined sequence of audio tones from the transceiver 18. As has been described, the decoder 64 acts as a combination lock for the base station, preventing unauthorized access to the telephone line by operators of remote radio transceivers. Upon receipt of the appropriate code signals, then, coil 110 is energized to close switch 108, thereby applying bias voltage through line 111 to the relay network 52. This bias voltage is also applied to line 54 so that upon closure of movable and fixed contacts 112 and 113 of switch 41, an input voltage is applied by way of line 56 and through a potentiometer 114 to the base of a transistor amplifier Q3, turning Q3 on. Transistor Q3 is in a grounded emitter configuration, with its collector connected through a timing capacitor 116 to the bias voltage on line 111 and also being connected to the base of a second transistor amplifier Q4 which operates as a switch. The emitter of Q4 is connected to the bias line 111 by way of a resistor 118, while its collector is connected through a coil of a time delay relay 121 to ground.

When Q3 is turned on, by closure of switches 41 and 108, capacitor 116 is charged and transistor Q4 switches on to produce a current flow through coil 120. Energization of coil 120 shifts its movable relay contact 122 to engage stationary contact 124, thereby connecting resistor 58 in parallel with the telephone lines 14 and, as previously indicated, activating the telephone line to produce a dial tone and to permit communication with the telephone system. After capacitor 116 has been charged by the activation of the time delay relay 121, it serves to hold the relay on for a selected period of time after the opening of its control switch 41, the time depending upon the value of the capacitor. If desired, a variable capacitance may be provided to permit adjustment of the hold time, but it has been found that a fixed capacitor is suitable if its value is selected to hold Q4 on and coil 120 energized for about 15 to 25 seconds after the end of a transmission from the mobile station and the resultant opening of switch 41.

During the selected time interval of network 52, the system remains connected to the telephone lines, but if additional signals are not received from the remote unit during this interval, the delay network 52 will time out and contacts 122, 124 will open, effectively hanging up the telephone. Accordingly, in the operation of the present system it is necessary for the remote operator periodically to transmit a signal in order to recharge capacitor 116 and thereby maintain the connection with the telephone system. In practice it has been found that this is not an undue burden, since it is rare in a two-way conversation for one party to speak for much more than 15 seconds at a time. Furthermore, this hangup feature allows the system to disconnect from the telephone line in the event that a busy signal is obtained in response to a dialed number; if this hangup feature were not available, the repetitive audio frequency sounds generated by the ringing signal would hold the base station in the transmit mode indefinitely.

To permit transmission of audio frequency signals originating on the telephone line 14, the voice operated relay (VOX) circuit 66 is provided. Signals on line 14 are applied to this VOX circuit by way of lines 60 and 62, line 60 being connected through a capacitor 126 to the base of a transistor amplifier Q5 so that the applied signals serve to turn Q5 on. The emitter of Q5 is connected through a resistor 128 to line 62 and to ground, while the collector is connected through resistors 130 and 132 and line 133 to a source of bias voltage. The junction between resistors 130 and 132 is connected through a capacitor 134 to ground. The collector of Q5 is connected directly to the base of a transistor amplifier Q6, the emitter of which is connected through an R-C filter comprising resistor 136 and parallel capacitor 137 to ground and through a feedback resistor 138 to the base of Q5. The collector of Q6 is connected through a bias resistor 140 the source of bias voltage on line 133 and is also connected through a capacitor 142 and a potentiometer 144 to ground. Conduction of Q5 turns Q6 on and the feedback circuitry insures that both are rapidly turned to full on condition for rapid response to incoming signals.

The sliding arm of the potentiometer 144 is connected to the base of a third transistor amplifier Q7 which is in a grounded emitter configuration, with its collector being connected through a timing capacitor 146 to the bias supply and to the base of a fourth transistor Q8 which operates as a switch. When Q6 is turned on by the application of an audio signal to the base of Q5, transistor Q7 becomes conductive. This charges capacitor 146, with the voltage across the capacitor controlling Q8. The emitter of Q8 is connected through resistor 148 to the bias supply line 133, while its collector is connected through the coil 150 of a VOX relay 152 to ground. The VOX relay includes a movable switch contact 154 and a stationary contact 156 which are normally open, but which are closed upon energization of the VOX network 66 by an audio signal appearing on the telephone line.

During the time that the carrier operated relay circuit 36 is energized; i.e., when there is a squelch voltage being produced by receiver 18 in the absence of a signal from the remote transceiver, movable and stationary contacts 158 and 160, respectively, of the relay switch 42 are held in the closed position illustrated in FIG. 2. Any audio frequency signals originating on the telephone line which activate the VOX circuit 66 and the VOX relay 152, will close contacts 154, 156, thereby completing a circuit through contacts 158, 160 and through lines 68 and 70, producing an input signal to the transmit-receive portion of the base transceiver 10 to shift it to its transmit mode. When this occurs, the same telephone line audio signals, which have also passed through the impedance match network 48 to appear on lines 50, 51, will be transmitted by the base transceiver 10. Such transmitted signals may represent ringing signals or voice communication originating in the telephone system and being applied to line 14, and thus may serve to initiate communication with the remote transceiver or may be part of a continuing conversation. The timing capacitor 146 in the voice operated relay 66 holds the VOX relay 152 on for approximately 1½ seconds after the end of a signal from line 14 to prevent the base station from shifting to the neutral or the receive mode between syllables of spoken words. However, for pauses greater than 1½ seconds, the VOX relay 152 will become deenergized, opening contacts 154, 156 to allow the base transceiver to return to its receive mode and the matching circuit 12 to return to its neutral condition, at which time the remote transceiver can break in and shift the base station, including the matching circuit, to the receive mode. If the remote station does not break in, a subsequent audio signal on the telephone line will again shift the base station to the transmit mode, and will continue to do so until the time limit imposed by relay network 52 is reached.

It will be apparent from the above that the voice operated relay circuit 66 responds to voice signals on the telephone line to shift the base station to its transmit mode, while the carrier operated relay circuit 36 responds to received carrier signals on the frequency of the base receiver to shift the base station to the receive mode. If the voice operated relay circuit detects a signal on the telephone line, it will shift the base station to the transmit mode and hold it there as long as that signal continues, but any break in that signal of more than 1½ seconds will cause the base station to revert to a neutral condition, placing the base transceiver in its receive mode. Similarly, receipt of signals from the remote station will switch the base station to the receive mode to activate the telephone system, and will hold the base station in communication with the telephone line for a selected period of time, preferably about 25 seconds after the termination of the signal from the remote station. During this 25 second delay, the base station may be in the transmit mode, but at the end of that time period the system will hang up unless additional signals are received from the remote station. It will be noted that received audio signals being transmitted from the remote unit and transferred to the telephone line will also be applied by way of lines 60 and 62 to the input of the voice operated relay circuit, and such signals will activate the VOX relay 152. However, in such a situation, the receiver portion of the base unit 10 is operative, and the squelch signal is absent from lines 34 and 35. Accordingly, switch contacts 158 and 160 of relay switch 142 are open, and this prevents the VOX relay from shifting the base transceiver 10 to its transmit mode.

It has been found that if the present system is connected to a telephone party line having more than one subscriber, it is possible for audio signals from party line conversations other than those directed to the station to which the present system is connected to activate the system. To prevent such spurious voice signals from operating the transmitter of base station 10, a capacitor 161 is connected between stationary contact 162 of relay 121 and the base of transistor Q5 by way of lines 163 and 164. This capacitor prevents audio frequency signals from activating the VOX circuit 66 before relay 121 is activated. It should be noted, however, that the value of capacitor 161 is selected so that a 90 v. A.C. ring signal will still activate the VOX circuit to allow the system to receive incoming calls. When such calls are answered at the remote station by "picking up" the relay network 52 and activating relay 121, capacitor 161 is removed from the circuit and audio signals can activate the VOX network.

Figure 3:
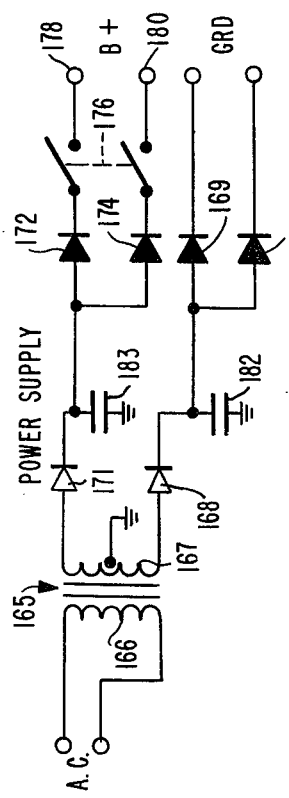
FIG. 3 is a schematic diagram of a suitable power supply for use with the matching system of FIG. 2.

FIG. 3 illustrates a suitable power supply arrangement for the base station of the present invention, the power supply including an input transformer 165 having a primary coil 166, which is connected to a suitable source of alternating current, and a secondary coil 167. The secondary coil has a grounded center tap, with the lower end of the coil being connected through a first diode 168 and through a pair of parallel connected diodes 169 and 170 to provide a first B+ reference point for the circuit of FIG. 2. The upper end of coil 167 are connected to the input of diode 171 which is connected, in turn, to parallel diodes 172 and 174 and through a master on-off switch 176 to the bias supply terminals 178 and 180 which are used to supply a second bias voltage to the base station circuitry. Filter capacitors 182 and 183 are connected between the cathodes of diodes 168 and 171, respectively, and ground in known manner.

Although the system illustrated herein is designed for use with a Touch Tone telephone system, it is recognized that not all telephone systems are responsive to tone dialing. If it is desired to utilize the present system with a conventional pulse dialing system, the present system may be modified to accomodate such a connection by providing a mechanical rotary dial at the remote transceiver. With such an arrangement, an audio tone is generated and the tone is interrupted by the operation of the dial to provide audio frequency tone pulses. If the base station includes the tone generator 34 and the tone decoder 64, the appropriate tone frequency must be transmitted from the remote transceiver, as previously described, to pick up the base station and the telephone line before the dial pulses are generated. Such tone signals would, as before, activate the carrier operated relay and the time delay relay to produce a dial tone at the telephone line.

Figure 4:
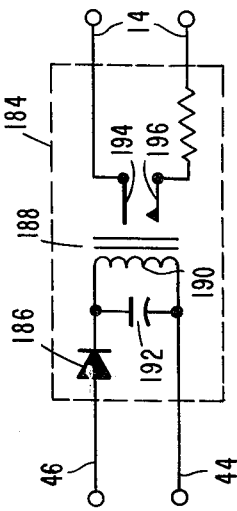
FIG. 4 is a schematic diagram of a voltage pulse converter used in a modified form of the invention.

The base station is modified to receive the rotary dial pulses by providing a tone-to-voltage pulse converter network 184 such as that illustrated in FIG. 4. This network may be connected in parallel with the impedance match network 48, between receiver output lines 44, 46 and the telephone line 14. Network 184 converts the received tone pulses generated by the rotary dial unit to corresponding voltage pulses of the type required to activate the telephone dialing equipment, and includes an input diode 186 connected to line 46, dialing relay 188 including a coil 190 connected across lines 44 and 46, and a filter capacitor 192 connected across coil 190. The dialing relay also includes a pair of contacts 194 and 196 which are closed upon energization of relay 188, the opening and closing of contacts 194, 196 producing a series of voltage pulses on line 14 of the type required by a dial-type telephone system. Thus, the operation of the rotary dial at the remote transceiver produces corresponding voltage pulses on the telephone line 14 whereby the desired number can be dialed. Thereafter, the system operates as before.

In brief, therefore, the present invention provides a radio-telephone matching system which permits single-frequency, two-way conversation between a remote transceiver and a telephone system. With the present arrangement, if an operator at a remote location wishes to place a telephone call, he switches his transceiver to the transmit mode and by means of a suitable tone generator transmits a predetermined sequence of tones which operate to enable the base station. Thereafter, he operates a Touch Tone pad, or a rotary dial, to produce a series of signals which are fed through the base station to the telephone line to dial the telephone number of the desired party. During the dialing operation, the base station is held in its receive mode by means of a carrier operated relay, and at the end of the transmission, this relay shifts the base station to a neutral mode wherein it is connected to the telephone line and is capable of receiving signals either from the telephone line or from the remote transceiver. The base station remains in this neutral condition under the control of a time delay relay until that relay times out. When the telephone being called is answered, the answering voice signals are fed through a VOX circuit to shift the base station to a transmit mode, and the voice signals are transmitted to the remote transceiver. At the end of the answering voice communication, or during pauses in it, the operator at the remote transceiver can, by transmitting a carrier signal, shift the base station to its receive mode, renewing the time delay relay and providing an audio path between the remote transceiver and the telephone line. Only upon release of the transmitter at the remote station can the base unit shift back to its transmit mode to permit two-way, nonsimultaneous, simplex communication.

In a similar manner communication between a telephone subscriber and the remotely located operator of the present system can be initiated by the telephone subscriber dialing the number of the telephone line to which the matching circuit 12 of the present invention is connected. This will cause ringing signals to appear on telephone line 14 which signals activate the VOX relay 66, shifting the base transceiver to its transmit mode. The ringing signals are then transmitted by way of lines 50 and 51 and the transmit section 16 to the remote transceiver. To answer the telephone, the operator at the remote transceiver switches his unit to the transmit mode to capture the base station between ringing signals and to shift it to the receive mode.

Although the present invention has been described in terms of a specific embodiment, it will be apparent to those of ordinary skill in the art that numerous modifications and variations may be made without departing from the true spirit and scope thereof as defined in the following claims. Further, it will be apparent that the present unit can be used to provide remote control of equipment which may be connected to the telephone lines 14, which equipment may be operated, for example, by control signals generated by the Touch Tone pad. In addition, two base stations may be used as intermediates between two mobile units, so that a first mobile unit can dial the telephone number of the telephone line to which the second base station is connected, thereby establishing two-way communication through both base stations and the interconnecting telephone system. Such arrangements greatly expand the utility and the range of remote transceivers.

What is claimed is:

1. A radio-telephone interconnection system adapted to connect a base radio transceiver having transmitter and receiver portions to a conventional telephone line, comprising:

carrier operated means adapted to be connected to the receiver portion of the base transceiver and responsive to receiver squelch signals, the receiver squelch signals energizing said carrier operated means until a radio signal is received by the transceiver, said received signal breaking the squelch signals to deenergize said carrier operated means;

an impedance match network adapted to couple the audio output of the receiver portion of the base transceiver to a telephone line and to couple the telephone line to the audio input of the transmitter portion of the base transceiver;

a first switching means responsive to said carrier operated means interposed between the audio output of the receiver portion of the base transceiver and said impedance match network, whereby the audio output is coupled to said impedance match network only in the absence of receiver squelch signals during the receipt of radio signals by the base transceiver;

a second switching means responsive to said carrier operated means;

first time delay means responsive to said carrier operated means and adapted to activate the telephone line in the absence of receiver squelch signals, said first time delay means including a first timing circuit responsive to said second switching means, said first timing circuit being activated by said second switching means each time said carrier operated means is deenergized by the breaking of the receiver squelch signal, and a timed relay energized upon activation of said first timing circuit, said first timing circuit holding said timed relay in its energized condition for a first predetermined period of time;

a third switching means responsive to said timed relay for activating said telephone line, holding said telephone line for said first predetermined period of time after the return of the receiver squelch signal, and for deactivating said telephone line at the expiration of said first predetermined period of time when said first timing circuit times out;

voice operated means responsive to audio frequency signals on said telephone line, said voice operated means including a second timing circuit adapted to be connected to the telephone line and to be activated by audio signals thereon and VOX switching means energized upon the occurrence of said audio signals and being held in the energized condition by said second timing circuit for a second predetermined period of time after the end of said audio signal;

fourth switching means adapted to connect said VOX switching means to the base transceiver for switching the transceiver from a receive mode to a transmit mode upon energization of said VOX switching means, said fourth switching means being responsive to said carrier operated means to disconnect said VOX switching means from said base transceiver upon receipt of a radio signal from a remote station while the base transceiver is in a receive mode to hold the transceiver in the receive mode, said second timing means maintaining energization of said VOX switching means during the presence of audio signals and for said second period of time thereafter to permit immediate transfer of the transceiver to the transmit mode at the termination of said radio signal to prevent syllable loss in the transfer of the transceiver to the transmit mode, said second timing means further maintaining energization of said VOX switching means to hold said transceiver in the transmit mode for said second predetermined period of time during pauses in said audio signal to prevent transfer of the transceiver back to the receive mode during pauses of less than said second period of time, but to permit said VOX switching to time out and permit the transceiver to shift to its receive mode during pauses exceeding said second period of time, whereby two-way communication can be effected through said interconnection system.

2. The system of claim 1, further including means for selectively disabling and enabling said first time delay means for preventing unauthorized use of said interconnecting system.

3. The system of claim 2, wherein said disabling and enabling means comprises decoder means responsive to predetermined audio frequency signals received by the base transceiver.

4. The system of claim 1, wherein said carrier operated means comprises a first transistor switch responsive to said squelch signal, a control relay connected to said first transistor switch for operating relay control contacts, and a main carrier operated relay energized through said relay control contacts.

5. The system of claim 1, wherein said fourth switching means responsive to said carrier operated means comprises contacts controlled by a main carrier operated relay and connected in series with said VOX switching means, said contacts being opened by the breaking of the receiver squelch signal to prevent said voice operated means from shifting said transceiver to the transmit mode during the reception of any radio signals which break said squelch signal.

* * * * *